United States Patent [19]
Winkelhorn

[11] Patent Number: 5,267,080
[45] Date of Patent: Nov. 30, 1993

[54] STEREOPTIC VIEWER

[76] Inventor: Karin Maria K. Winkelhorn, 3540 W. Sahara Ave., Ste. 25, Las Vegas, Nev. 89102

[21] Appl. No.: 851,845

[22] Filed: Mar. 16, 1992

[51] Int. Cl.⁵ .................................... G02B 27/24
[52] U.S. Cl. .................................... 359/482; 359/471
[58] Field of Search ............... 359/472, 471, 473, 474, 359/477, 479, 482, 481, 480, 446, 462, 857; 351/201, 202

[56] References Cited

U.S. PATENT DOCUMENTS

| | | | |
|---|---|---|---|
| 1,971,119 | 8/1934 | O'Neil | 359/482 |
| 2,255,197 | 9/1941 | Thomas | 359/482 |
| 2,289,467 | 7/1942 | Taylor | 359/472 |
| 2,359,703 | 10/1944 | Wood | 359/472 |
| 2,377,671 | 6/1945 | Burlo | 359/857 |
| 3,891,303 | 6/1975 | Barquero | 359/466 |
| 4,550,978 | 11/1985 | Friende | 359/472 |

Primary Examiner—Jon W. Henry
Attorney, Agent, or Firm—Beehler & Pavitt

[57] ABSTRACT

A stereoptic viewer comprised of a vertical panel supported by rearwardly extending temples for mounting on a person's ears, the panel defining an opening through which both eyes of the person may see. A first side of the opening provides an unobstructed view of the screen or image to be observed, while the thin (second) side of the opening is intercepted by a mirror held at a 45 degree angle to pick up the image appearing on a second 45 degree angle mirror, extending away from the first side of the opening. Thereby, the image observed is slightly displaced to provide the stereoptic effect. At least one mirror may be slightly adjustable.

6 Claims, 2 Drawing Sheets

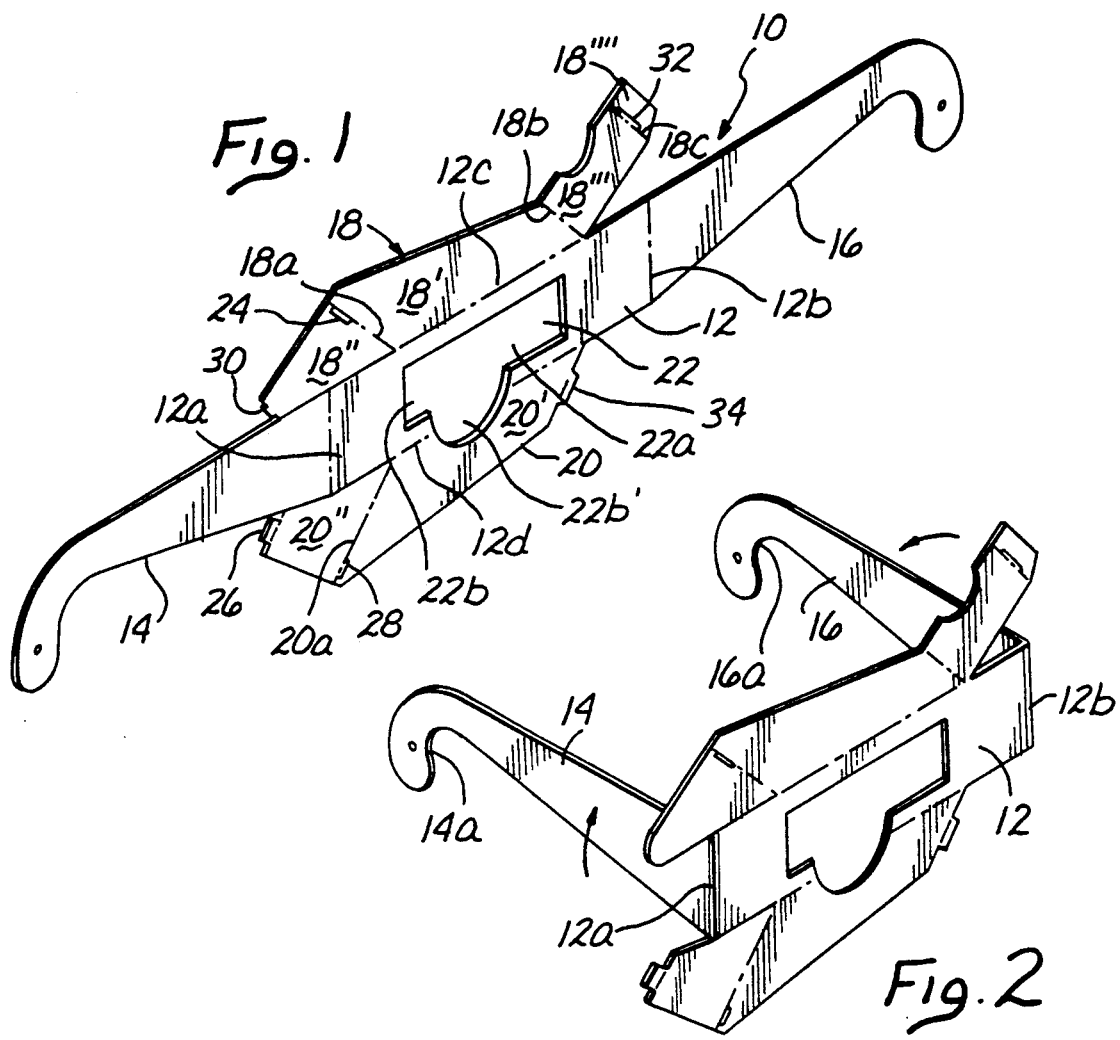
Fig. 1
Fig. 2
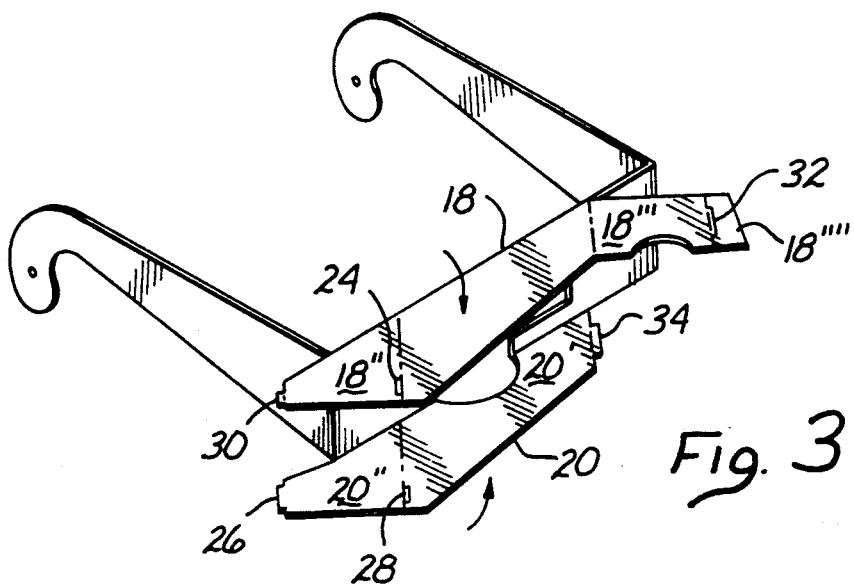
Fig. 3

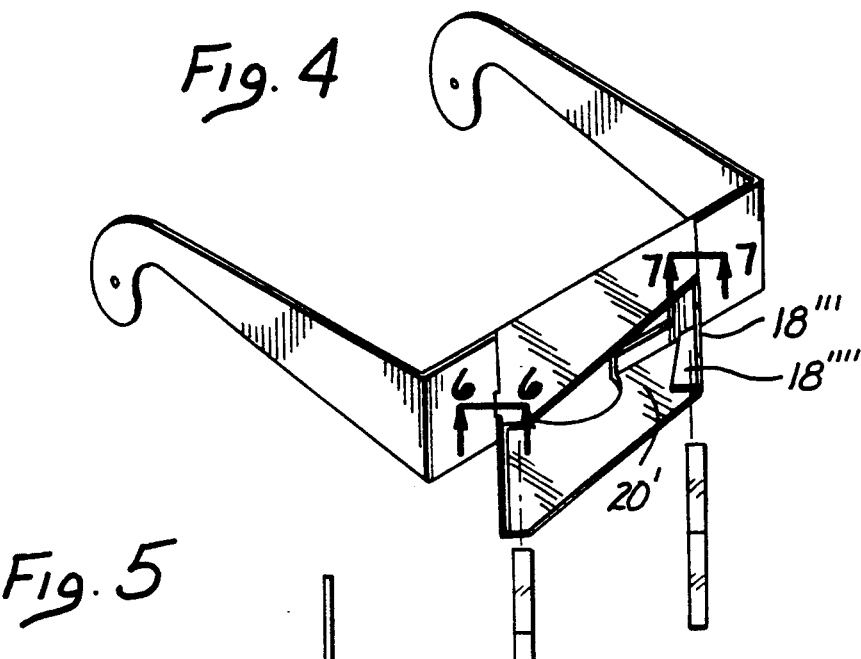
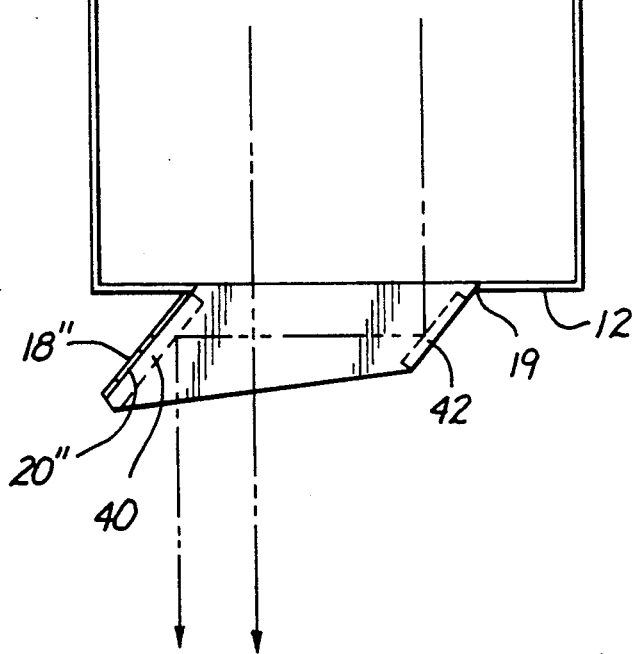
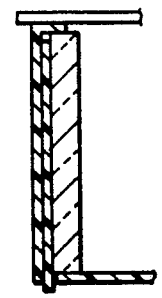
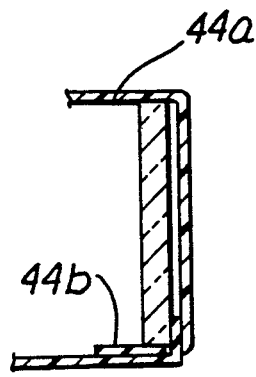

STEREOPTIC VIEWER

FIELD OF THE INVENTION

This invention relates generally to the field of optics and specifically to viewers through which an object, picture screen or images appearing on a cathode ray tube may be viewed to produce a stereoscopic effect.

BACKGROUND OF THE INVENTION

In the Nostram's Scientific Encyclopedia (4th Ed.), the term stereoscope is defined on page 1741 as follows: "The sensation of depth of an object is due to binocular vision; that is, to the fact that two eyes do not each see exactly the same view. By taking two pictures with a camera moved a few inches—or with a double stereoscopic camera—two slightly different pictures are obtained. A stereoscope is a device by which each eye sees only one of the pictures and the same sensation of depth is obtained as with direct binocular vision."

In this treatise under the heading "Stereoscopic Photography" it is pointed out that in 1833 the British scientist Sir Charles Wheatstone is generally credited with the invention of the stereoscope. These devices were popular from the middle of the 19th century and remained so until advances in photography which occurred in the 20th century. Aside from polarized types of glasses, little attention appears to have been devoted to producing novel stereoscopic viewers in recent years.

So far as is known, most viewers involve looking at two side by side photographs in the manner referred to above, or viewing a single image with two different polarizations.

In recent years, with the tremendous popularity of televisions and VCRs, innumerable people find themselves watching the images which appear on the cathode ray tubes of a TV and/or VCR. Unfortunately, however, most images which appear on such tubes are not three dimensional. Consequently, viewers generally do not see any depth of the images with a result that much of the value of what can appear on the screen is lost.

What has been needed, therefore, is an inexpensive type of stereoptic viewer which can be widely distributed among TV and VCR watchers, with the object of enabling such watchers to enjoy more depth perception of images which appear on their screens.

SUMMARY OF THE INVENTION

In order to accomplish a stereoptic effect, the present invention contemplates providing a slight offset of the image seen by one eye from that perceived by the viewer's other eye. In order to accomplish this, one eye is provided with a clear, unobstructed vision of the image or screen to be viewed, while the other eye sees such image or screen displaced by a novel 45 degree mirror arrangement. Thus, the image seen by the other eye arrives first through a 45 degree angle mirror directed at the object, where the image is reflected to a second 45 degree angle mirror disposed in immediate view of the other eye, and also directed at the first 45 degree angle mirror. Thereby, the two eyes of the viewer see in the case of one eye a direct view of the image, and in the case of the other eye, a reflected view of the image which is sufficiently displaced to provide a stereoptic effect. At least one of the two mirrors, desirably, should be slightly adjustable.

This mirror arrangement may be mounted on the front plastic panel of the viewer, which panel is supported by a pair of temples extending from the ends of the back panel over the viewer's ears. The panel itself defines an opening which provides the required visual paths to both of the wearer's eyes. These paths, as explained above, involve a direct view for one eye and a reflected view for the other eye.

DESCRIPTION OF THE DRAWINGS

In the accompanying drawings:

FIG. 1 is a perspective view of a plastic stamping, which when folded, will become the frame for the viewer;

FIG. 2 is a perspective view of the stamping of FIG. 1, showing the temple supports folded rearwardly;

FIG. 3 is a similar perspective view of the stamping showing further folding to define the mirror holding portion of the framing.

FIG. 4 is a similar perspective view, showing the mirror supporting portion of the framing receiving the mirrors;

FIG. 5 is a plan view of the viewer after all folding has been completed and the mirrors have been mounted.

FIG. 6 is a section taken on the line 66 of FIG. 4; and

FIG. 7 is a section taken on the line 77 of FIG. 4.

DESCRIPTION OF THE PREFERRED EMBODIMENT

Referring to the accompanying drawings:

A stamping 10 from a thin sheet of polystyrene or cardboard is made in the configuration shown in FIG. 1. This configuration includes a rectangular panel 12 with endwise extensions 14 and 16 and top and bottom attachments, 18, 20, respectively. The stamping is scored along panel end extension lines 12a and 12b, and along upper and lower lines 12c, 12d, respectively, to permit bending along those lines of the respective extensions and attachments. The panel 12 defines an opening 22, one side 22a of which may be rectangular, and the other side 22b of which, in addition to being partially rectangular, includes a larger opening 22b', shown as circular.

The attachment 18 is scored transversely at 18a, 18b and 18c to enable portions of the attachment 18 to be bent with respect to its central panel portion 18'. Similarly, panel 20 is scored at 20a to enable the portion 20" to be bent with respect to the main attachment panel 20'. The portion 18" of the attachment 18 which is bendable with respect to the panel portion 18' is slotted at 24 to receive a projection 26 on the bendable portion 20' of the attachment 20, and a slot 28 is provided at the end of the panel portion 20', to receive a projection 30 on the end of the bendable portion 18" of the attachment 18. Further, a slot 32 along the inner edge of the foldable end piece 18"" is provided to receive a projection 34 at the end of the panel portion 20' of the attachment 20, With the stamping ten thus formed, assembly of the viewer may be commenced. Initially, the end portions 14 and 16 are folded back from the ends of the panel 12 along the lines 12a and 12b respectively, thereby to form a pair of temples for the viewer. As may be seen from FIGS. 2, 3 and 4, the ends 14a and 16a of the end pieces 14 and 16, respectively, are preferably curved to fit over a person's ears to prevent the viewer from slipping off the person's head during use of the viewer.

Referring next to FIG. 3, the attachment piece 18 is then bent forward and downwardly to a horizontal position, and the lower horizontal attachment piece 20 is bent forward and upwardly to a horizontal position parallel with the piece 18. The end piece 18''' is then bent down to a vertical position to bring the slot 32 over the projection 34, but with the piece 18'''' being further bent at a right angle to abut the upper face of the panel portion 20' of the attachment piece 20, as best seen in FIG. 4. On the opposite ends of the attachment pieces 18 and 20, respectively, the foldable end pieces 18'' and 20'' are swung downwardly and upwardly, respectively, to be brought into face to face engagement and locked together by forcing projection 30 into slot 28 and projection 26 into slot 24.

Because of the geometry of the end pieces 18'', 18'''and 20'' and the manner in which these pieces swing into interlocking engagement at the ends of the attachment pieces 18 and 20, when such engagement is completed, it will be seen that they form 45 degree angles with the front face of the panel 12. In the case of 18''', its 45 degree angle partially covers the opening 22 and its rectangular portion 22a, while in the case of the interlocking end pieces 18'' and 20'', the 45 degree angle is formed away from the opening, as best illustrated in FIGS. 4 and 5.

To complete the viewer, a mirror 40 is attached to the outer face of the piece 20' and another mirror 42 is attached by the edge 42' to the inner face of the piece 18''' adjacent the intersection of the vertical edge 19 of the end piece 18''' with the panel 12. By such attachment, the mirror 42 may be pivoted at least slightly between the inner face of the piece 18''' and the front face of the panel 12. This allows for adjustability of the mirror. However, in order to enable the mirror 42 to be adjustably set in any selected angular position, a rough fabric 44a, 44b, such as is used to receive the hooked portions of a VELCRO combination, is provided both above and below the mirror 42, by attachment to the inner faces of the attachment pieces 18, 20 respectively.

From the construction described, it will be seen that, as shown in FIG. 5, the right eye of the viewer obtains a direct unobstructed view of the image, while the left eye of the viewer sees the image first reflected by the mirror 40 and secondly, by the mirror 42, thereby to produce the desired stereoscopic effect. The adjustability of the mirror 42 assures the user of the ability to displace the image being viewed as necessary for such effect.

I claim:

1. A viewer to enable a person to perceive an image appearing on a screen with stereoptic effect, said viewer comprising:
    (a) a first rigid transverse panel having a width at least as great as the distance between the person's temples, said panel being vertically disposed, and having a pair of rearwardly extending elements adapted to fit over the person's ears to support the panel in the manner of a pair of glasses, said panel defining an opening of a width at least as great as the distance between the person's eyes and of a height sufficient to permit the person's eyes to have unobstructed viewing through the opening;
    (b) first mirror means vertically disposed with one side of the mirror secured to the front face of the panel along an area defining one side of the opening, said first mirror means extending at a 45 degree angle over a portion of the opening with the mirror's reflective surface being visible through the opening, said mirror extension being over only such portion of the opening as not to obstruct sight of the screen image by one of the persons eyes through the opening;
    (c) second mirror means vertically disposed and secured to the front face of the panel along the area defining the opposite side of the opening from that along which the first mirror means is secured, said second mirror means extending at a 45 degree angle away from said other side of the opening with the mirror's, reflective surface facing outwardly from the panel, but visible in the first mirror means through the opening;
    Whereby, one of the person's eyes may view the image to be perceived directly through the opening, and the other of the person's eyes views the object through the first and second mirror means, to produce the desired stereoptic effect.

2. The viewer as described in claim 1 wherein said first mirror means is adjustable to better enable the person's eye directly viewing said mirror means to obtain the desired stereoptic effect.

3. A viewer to enable a person to perceive an image appearing on a screen with stereoptic effect, said viewer comprising:
    (a) a first transverse panel having a width at least as great as the distance between, the person's temples, said panel being vertically disposed, and having a pair of rearwardly extending elements adapted to fit over the person's ears to support the panel in the manner of a pair of glasses, said panel defining an opening of a width at least as great as the distance between the person's eyes and of a height sufficient to permit the person's eyes to have unobstructed viewing through the opening,
    (b) first mirror means vertically disposed with one side of the mirror means disposed in relation to the front face of the panel along an area of the panel defining one side of the opening, said first mirror means extending at a 45 degree angle over a portion of the opening with the mirror's reflective surface being visible through the opening, said mirror extension being over any such portion of the opening as not to obstruct sight of the screen image by one of the person's eye through the opening;
    (c) second mirror means vertically disposed in relation to the front face of the panel along the area defining the opposite side of the opening from that along which the first mirror means is disposed, said second mirror means extending at a 45 degree angle away from said other side of the opening with the mirror's reflective surface facing outwardly from the panel, but visible in the first mirror means through the opening;
    Whereby, one of the person's eyes may view the image to be perceived directly through the opening, and the other of the person's eyes views the object through the first and second mirror means, to produce the desired stereoptic effect.

4. The viewer as described in claim 3 wherein said first mirror is adjustable to better enable the person's eye directly viewing said mirror means to obtain the desired stereoptic effect.

5. The viewer as described in claim 3 wherein the panel is provided with upper and lower foldable and interlockable extensions, which, when folded outwardly of the panel and downwardly and are interlocked, comprise housings to receive and support each of the first and second mirror means.

6. The viewer as described in claim 5 wherein the first mirror means is pivotable about a vertical axis adjacent the panel within its housing and a fabric is disposed within said housing, transversely of said axis and in rubbing contact with at least one edge of the first mirror means to impede free movement of said first mirror means about said axis.

* * * * *